Patented June 2, 1925.

1,540,164

UNITED STATES PATENT OFFICE.

HEINRICH CLINGESTEIN, OF COLOGNE-ON-THE-RHINE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AMINOARYLALKYLTOLUOLSULFAMID AZODYES.

No Drawing.    Application filed January 3, 1924. Serial No. 684,258.

*To all whom it may concern:*

Be it known that I, HEINRICH CLINGESTEIN, a citizen of Germany, residing at Cologne-on-the-Rhine, in the State of Prussia, Germany, have invented new and useful Improvements in Aminoarylalkyltoluolsulfamid Azodyes, of which the following is a specification.

I have found that new and valuable azodyes for wool can be obtained by combining diazocompounds of ortho-aminoarylsulfoalkylanilides, e. g. 2-aminophenylhydroxyethyl-para-toluolsulfamide having most probably the formula:

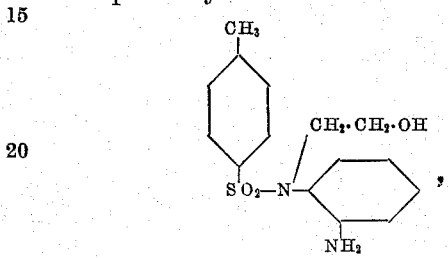

2 - aminophenylethyl - para - toluolsulfamide with azodyestuff components e. g. 4-sulfophenylmethylpyrazolon, 2-naphthol-6- or 8-sulfonic acid, 1-naphthol-4-sulfonic acid, 1-acetylamino-8-naphthol-3.6-disulfonic acid etc.

My new dyes are after being dried and pulverized in the shape of their salts with alkali metals reddish powders soluble in water generally with a yellow to orange to bluish-red coloration and in concentrated sulfuric acid generally with a reddish coloration. They yield upon reduction with stannous chlorid and hydrochloric acid an ortho-aminoarylsulfonalkylanilide and the aminocompound of the azocompound used. They dye wool from acid bath from yellow to orange to blue-red shades fast to milling which are distinguished by their good equalizing properties.

In order to illustrate my invention more fully, the following example is given, the parts being by weight:—30.6 parts of 2-aminophenyl-hydroxyethyl-para - toluol - sulfamide; (melting point 145—146° C.) are diazotized and coupled with 24 parts of 2-naphthol-8-sulfonic acid in a soda-alkaline solution. The dye having most probably the formula:—

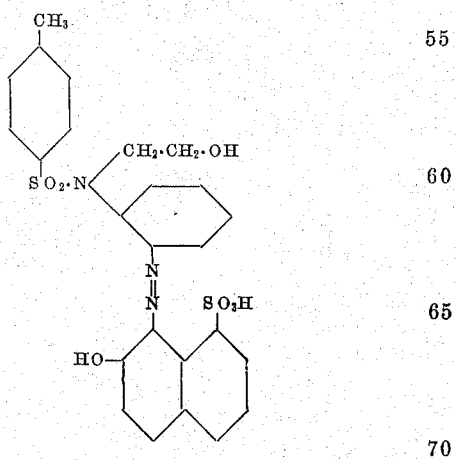

is salted out, filtered off and dried. It dyes wool orange shades fast to milling. It is a red powder soluble in water with a yellow, in concentrated sulfuric acid with a reddish-yellow coloration. Upon reduction with stannous chloride and hydrochloric acid it is split up into 1-amino-2-naphthol-8-sulfonic acid and 2-aminophenyl-hydroxyethyl-para-toluolsulfamide.

I claim:—

1. The herein described new azodyes obtainable by combining diazocompounds of ortho-aminoarysulfonalkylanilides with an azodyestuff component, which dyes are after being dried and pulverized in the shape of their alkali metal salts reddish powders soluble in water generally with a yellow to orange to bluish-red coloration and in concentrated sulfuric acid generally with a reddish coloration; being split up by treatment with stannous chloride and hydrochloric acid into an ortho-aminoarylsulfonalkylanilide and the aminocompound of the azocompound used: dyeing wool from acid bath from yellow to orange to blue-red shades fast to milling which shades are distinguished by their good equalizing properties; substantially as described.

2. The herein described new azodye having most probably the formula:—

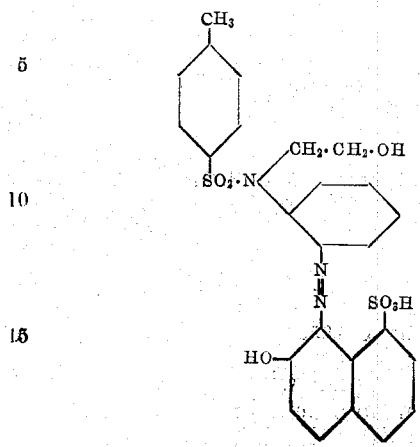

obtainble by combining the diazocompound of 2-aminophenyl-hydroxyethyl-para-toluolsulfamide with 2-naphthol-8-sulfonic acid, which dye is after being dried and pulverized in the shape of its sodium salt a red powder soluble in water with a yellow and in concentrated sulfuric acid with a reddish-yellow coloration; being split up upon treatment with stannous chlorid and hydrochloric acid into 1-amino-2-naphthol-8-sulfonic acid and 2-aminophenyl-hydroxyethyl-para-toluolsulfamide; dyeing wool orange shades fast to milling, substantially as described.

In testimony whereof I have hereunto set my hand.

HEINRICH CLINGESTEIN.